(12) United States Patent
Oikawa

(10) Patent No.: US 8,977,890 B2
(45) Date of Patent: Mar. 10, 2015

(54) MEMORY SYSTEM AND CONTROL METHOD

(71) Applicant: Kohei Oikawa, Kanagawa (JP)

(72) Inventor: Kohei Oikawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 13/722,149

(22) Filed: Dec. 20, 2012

(65) Prior Publication Data

US 2014/0068318 A1    Mar. 6, 2014

Related U.S. Application Data

(60) Provisional application No. 61/695,810, filed on Aug. 31, 2012.

(51) Int. Cl.
| | |
|---|---|
| *G06F 11/00* | (2006.01) |
| *G06F 12/02* | (2006.01) |
| *G06F 11/16* | (2006.01) |
| *G06F 11/10* | (2006.01) |
| *G06F 1/32* | (2006.01) |

(52) U.S. Cl.
CPC .......... *G06F 12/0246* (2013.01); *G06F 11/167* (2013.01); *G06F 11/1048* (2013.01); *G06F 1/3275* (2013.01); *Y02B 60/1225* (2013.01); *G06F 2212/1028* (2013.01); *G06F 2212/7207* (2013.01)
USPC ............. 714/6.1; 714/6.2; 714/6.24; 714/6.3; 714/42

(58) Field of Classification Search
CPC . G06F 11/167; G06F 11/0727; G06F 11/073; G06F 11/08; G06F 11/1666; G06F 11/2017; G06F 11/3034; G06F 11/3037

USPC ........ 714/6.1, 6.11, 6.13, 6.2, 6.21, 6.24, 6.3, 714/6.32, 42; 711/114, 111, 118, 120, 103; 365/227
See application file for complete search history.

(56) References Cited

U.S. PATENT DOCUMENTS

| 7,280,415 | B2 | 10/2007 | Hwang et al. | |
|---|---|---|---|---|
| 8,595,419 | B2* | 11/2013 | Rajan et al. | 711/103 |
| 2004/0213036 | A1* | 10/2004 | Farrell et al. | 365/154 |
| 2005/0268025 | A1* | 12/2005 | Smith et al. | 711/103 |
| 2010/0275050 | A1* | 10/2010 | Hong | 711/103 |
| 2013/0124888 | A1* | 5/2013 | Tanaka et al. | 711/103 |
| 2014/0071782 | A1* | 3/2014 | Lee et al. | 365/227 |

FOREIGN PATENT DOCUMENTS

| JP | 11-297086 | 10/1999 |
|---|---|---|
| JP | 2003-288791 A | 10/2003 |
| JP | 2011-65687 A | 3/2011 |

* cited by examiner

*Primary Examiner* — Joseph D Manoskey
(74) *Attorney, Agent, or Firm* — Oblon, McClelland, Maier & Neustadt, L.L.P.

(57) ABSTRACT

According to one embodiment, a memory system includes a first memory, a second memory, and a control unit. The first memory includes a volatile first register retaining a first operation parameter. The control unit performs a first operation of retaining the first operation parameter in the second memory. Then, the control unit turns OFF the first memory while retaining the first operation parameter in the second memory when an operation mode is switched from a first mode to a power saving second mode. Then, the control unit performs a second operation of turning on the first memory, and transferring the first operation parameter retained in the second memory to the first register when the operation mode is switched from the second mode to the first mode.

20 Claims, 9 Drawing Sheets

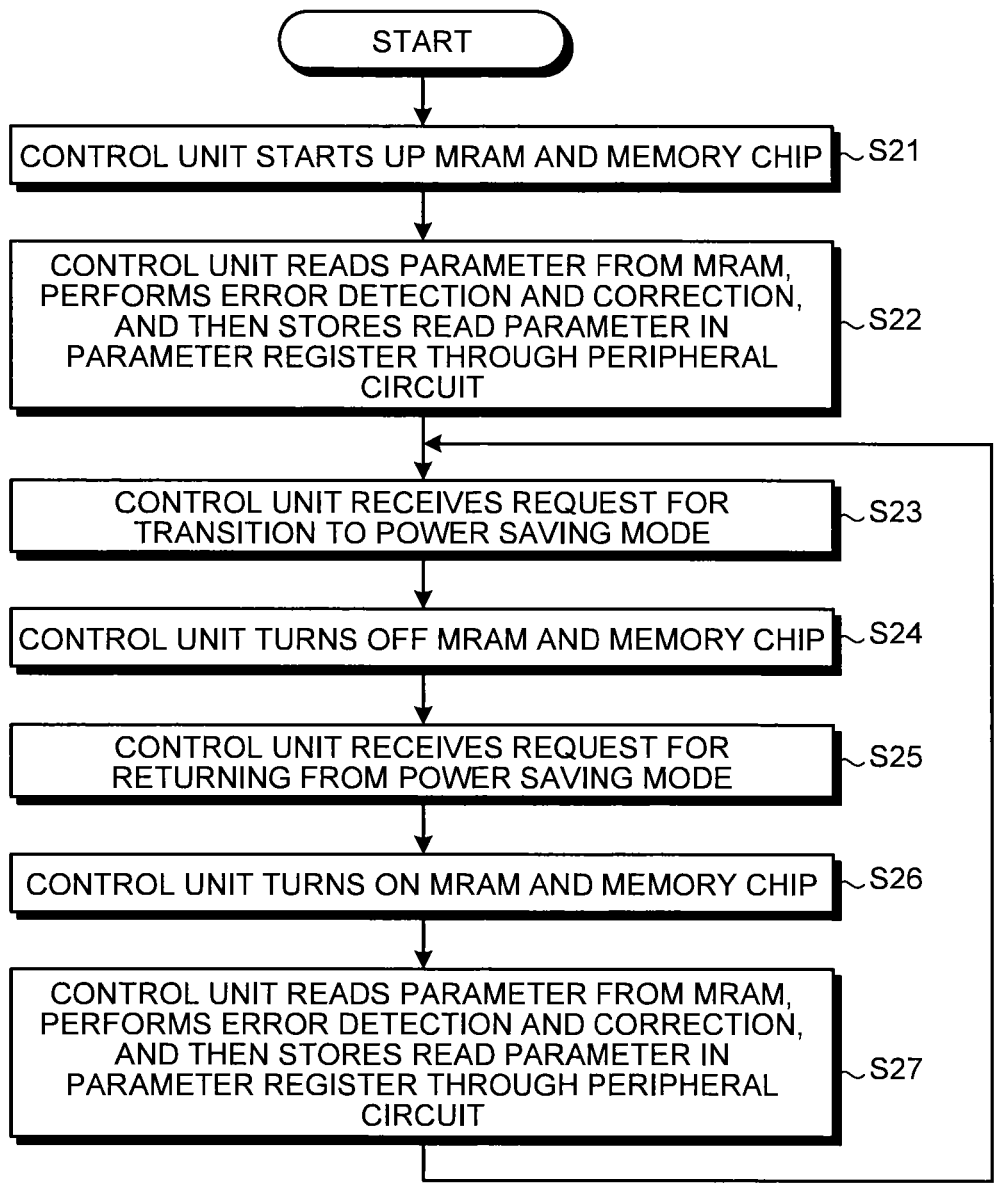

MEMORY SYSTEM AND CONTROL METHOD

CROSS-REFERENCE TO RELATED APPLICATIONS

This application is based upon and claims the benefit of priority from U.S. Provisional Patent Application No. 61/695,810, filed on Aug. 31, 2012; the entire contents of which are incorporated herein by reference.

FIELD

Embodiments described herein relate generally to a memory system and a control method.

BACKGROUND

As a memory system used for a computer system, a solid state drive (SSD) including NAND flash memory (NAND memory) is commanding attention. The SSD has an advantage such as a high speed and a lightweight when compared to a magnetic disk device. Individual memory chips included in the NAND memory retain, in a parameter register, an operation parameter describing information that specifies a defective cell, a setting value of internal control timing, a setting value of an internal voltage, and the like. Then, a memory cell array is accessed using the operation parameter retained in the corresponding parameter register.

BRIEF DESCRIPTION OF THE DRAWINGS

FIG. 9 is a flowchart illustrating an operation of the SSD of the third embodiment.

DETAILED DESCRIPTION

Figure 1:
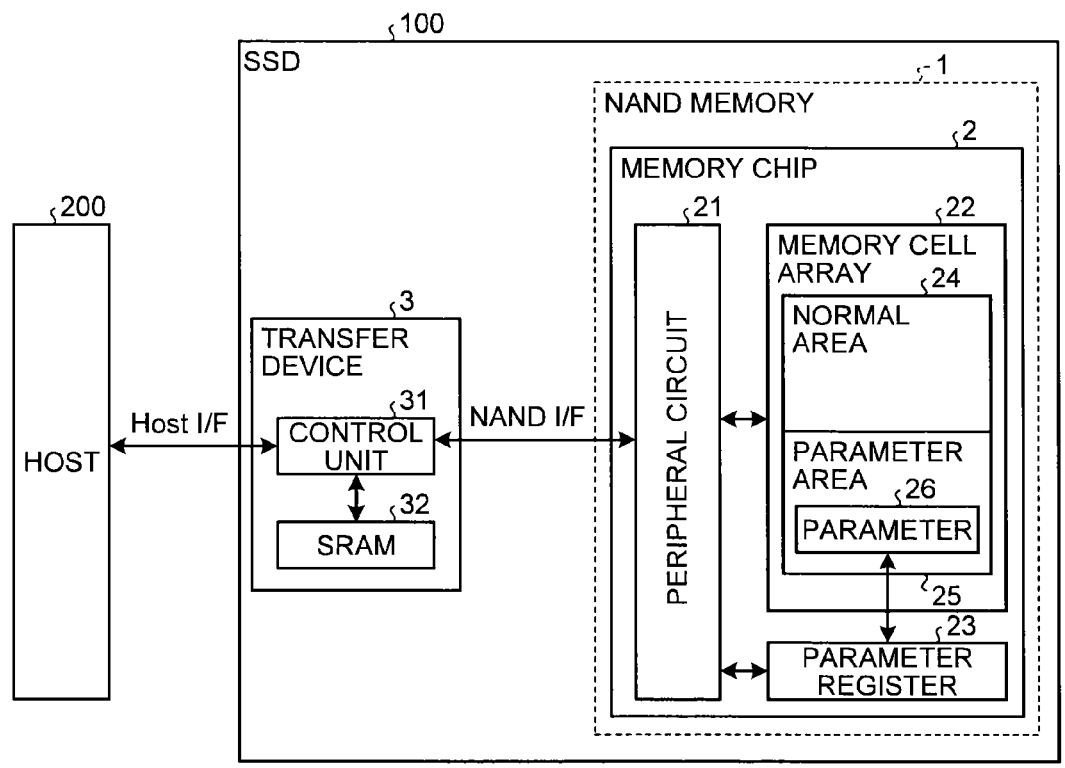
FIG. 1 is a diagram illustrating a configuration of an SSD of a first embodiment.

In general, according to one embodiment, a memory system includes a first memory, a second memory, and a control unit. The first memory includes a volatile first register retaining a first operation parameter. The control unit performs a first operation of retaining the first operation parameter in the second memory. Then, the control unit turns OFF the first memory while retaining the first operation parameter in the second memory when an operation mode is switched from a first mode to a power saving second mode. Then, the control unit performs a second operation of turning on the first memory, and transferring the first operation parameter retained in the second memory to the first register when the operation mode is switched from the second mode to the first mode.

An operation parameter may be stored in a NAND memory cell. In this case, at the time of startup, the operation parameter is read from the memory cell, and set to a parameter register.

However, when the operation parameter is stored in the memory cell, a period of time for reading is long, and thus a startup time of a memory chip (hereinafter, sometimes simply referred to as a chip) increases. In addition, power may be unstable immediately after the startup. In addition, since the operation parameter may not be used, a fluctuation between chips may not be corrected. For these reasons, reading the operation parameter from the memory cell may require longer period of time when compared to reading data (normal data) which is sent from a host device (hereinafter, referred to as a host) and written in the memory cell.

In addition, due to the long startup time of the chip, a startup time of the entire SSD increases, and an effective power saving mode is difficult to be applied. For example, when the memory chip is turned OFF in a power saving mode, performance is degraded since it takes time to return, or power may not be turned OFF to satisfy required performance.

In addition, a memory cell storing the operation parameter may be fixed in a predetermined area (hereinafter, a parameter area) rather than an area (normal area) in which normal data is written. To the normal data, rewriting may be performed by changing data position, and a stronger error correction or multiplexing may be performed. On the other hand, the operation parameter is read from the same position. As such, an exhaustion of the memory cell (precisely, the parameter area) is accelerated.

According to embodiments of the invention, a period of time for returning from a power saving mode may be reduced. In addition, an exhaustion of a memory cell may be reduced as possible.

A memory system and a control method according to embodiments will be described in detail with reference to accompanying drawings. Herein, an SSD to which a memory system according to embodiments is applied will be described. It should be noted that the range of application of the memory system according to the embodiments is not limited to the SSD. In addition, the invention is not limited to the embodiments.

FIG. 1 is a diagram illustrating a configuration of an SSD of a first embodiment. As illustrated, an SSD 100 is connected to a host device (host) 200 such as a personal computer through a host interface (I/F), and functions as an external storage device of the host device 200. A communication standard of the host I/F is not particularly limited. Examples of the communication standard of the host I/F include a serial advanced technology attachment (SATA), a universal serial bus (USB), an embedded multimedia card (eMMC), and the like.

The SSD 100 includes a NAND memory 1 and a transfer device 3 that transfers data between the host device 200 and the NAND memory 1. The NAND memory 1 includes a memory chip 2. A plurality of memory chips 2 may be included in the NAND memory 1. The NAND memory 1 and the transfer device 3 are connected to each other through a NAND interface.

The memory chip 2 includes a peripheral circuit 21, a memory cell array 22, and a parameter register 23.

A memory device capable of performing a higher speed operation when compared to the memory cell array 22 is applied to the parameter register 23. The parameter register 23 may be a volatile memory device.

The peripheral circuit 21 includes a row decoder, a column decoder, a sense amplifier, a voltage generation circuit, an interface circuit that communicates with the transfer device 3 through the NAND I/F, a chip control unit that controls these, and the like. The peripheral circuit 21 accesses the memory cell array 22 based on a command from the transfer device 3.

The memory cell array 22 is a storage area in which a plurality of NAND strings is arranged in a word line direction. In the storage area of the memory cell array 22, a normal area 24 in which normal data is stored and a parameter area 25 in which an operation parameter 26 is stored are secured.

The operation parameter 26 (hereinafter, simply a parameter 26) is various setting values individually tuned for each memory chip 2 to enhance performance of the memory chip 2 as possible. For example, the parameter 26 includes information that specifies a defective cell, a setting value of internal control timing, a setting value of an internal voltage, and the like. The peripheral circuit 21 may reduce a fluctuation of performance resulting from a production tolerance of each memory chip 2 as possible by using the parameter 26 to access the memory cell array 22. In addition, as a result, high speed access may be implemented.

At the time of startup of the memory chip 2, the peripheral circuit 21 reads the parameter 26 from the parameter area 25, and stores the read parameter 26 in the parameter register 23. Then, the peripheral circuit 21 accesses the normal area 24 by using the parameter 26 stored in the parameter register 23. Since the peripheral circuit 21 accesses the normal area 24 by using the parameter 26, a speed of accessing the normal area 24 is higher than a speed of accessing the parameter area 25.

The transfer device 3 includes a control unit 31 and a static random access memory (SRAM) 32.

The control unit 31 is connected to the host I/F and the NAND I/F. The control unit 31 performs overall control of the entire SSD 100. Specifically, in response to a request from the host 200, the control unit 31 may write normal data in the normal area 24, and read normal data from the normal area 24 to transfer the normal data to the host 200.

In addition, by controlling On and Off of a power supply to the NAND memory 1, the control unit 31 may transition an operation mode of the SSD 100 between a normal operation mode (hereinafter, a normal mode) and a power saving mode in which power consumption is low when compared to the normal mode. A trigger of transition between the normal mode and the power saving mode is arbitrary. For example, the control unit 31 may automatically generate a trigger of transition based on whether writing or reading is requested from the host 200. In addition, the control unit 31 may transition the operation mode in response to a request for a transition from the host 200.

Herein, when the peripheral circuit 21 reads the parameter 26 from the parameter area 25 at the time of returning from the power saving mode to the normal mode, a problem of taking time to return, a problem of the memory cell included in the parameter area 25 being exhausted, and the like occur. To resolve these problems, the SSD 100 stores the parameter 26 in the SRAM 32 in the power saving mode, and stores the parameter 26 stored in the SRAM 32 in the parameter register 23 at the time of returning to the normal mode.

Specifically, the peripheral circuit 21 is configured to be able to read the parameter 26 stored in the parameter register 23 and send the parameter 26 to the control unit 31, and to store the parameter 26 sent from the control unit 31 in the parameter register 23. Then, before transitioning to the power saving mode, the control unit 31 requests the parameter 26 from the peripheral circuit 21, and stores the parameter 26 sent at the request in the SRAM 32. In addition, when transitioning to the normal mode, the control unit 31 restarts to supply power to the memory chip 2 in a mode in which the parameter 26 is not read from the parameter area 25. Then, the control unit 31 reads the parameter 26 stored in the SRAM 32, and stores the read parameter 26 in the parameter register 23 through the peripheral circuit 21.

The control unit 31 has the same configuration as that of a computer including, for example, an arithmetic unit, a storage device, and an I/O circuit. A function as the control unit 31 is implemented when the arithmetic unit executes a predetermined program. The control unit 31 may be implemented by a hardware circuit such as an ASIC. In addition, the control unit 31 may be implemented by a combination of a hardware circuit and a computer.

Figure 2:
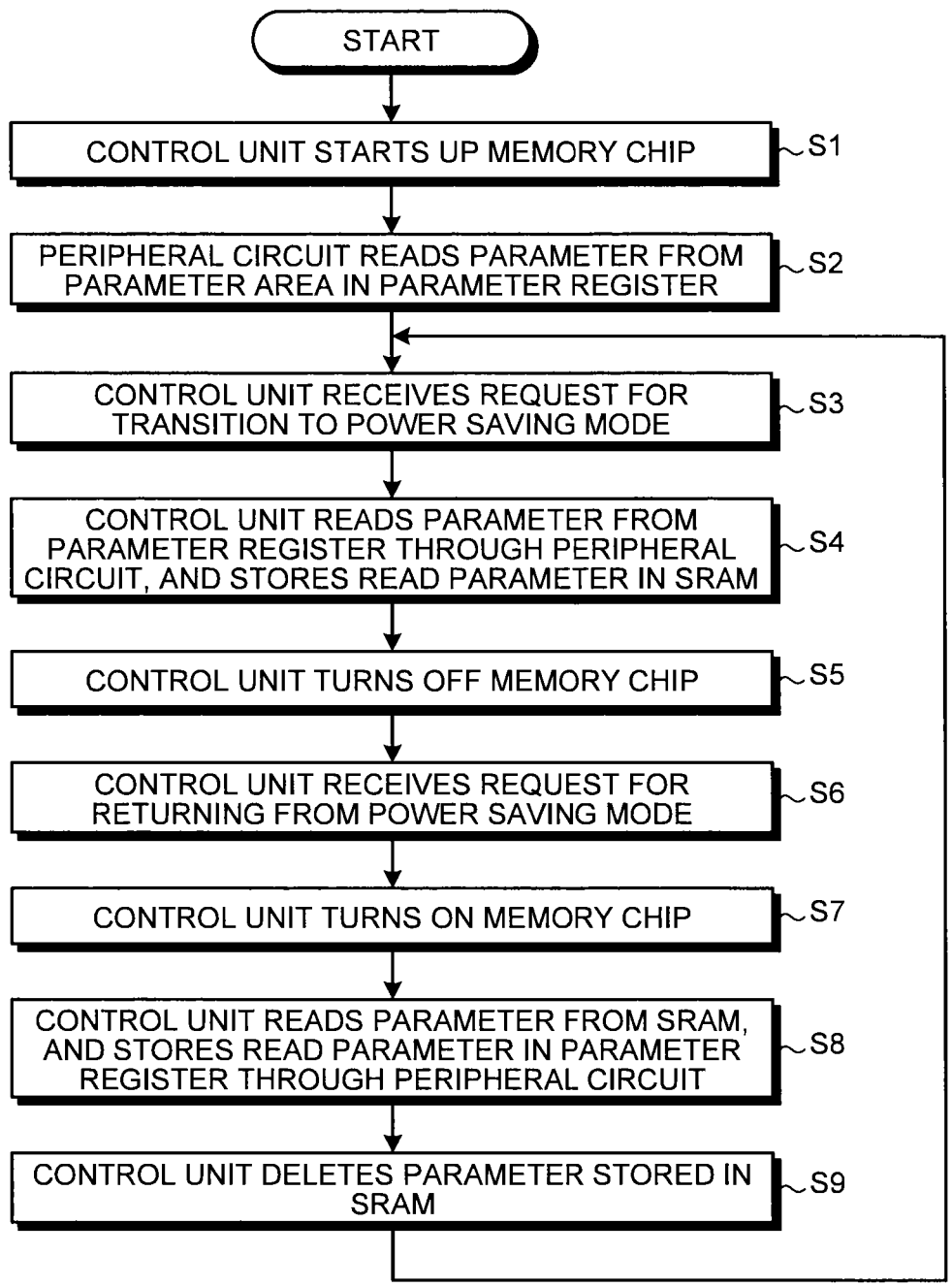
FIG. 2 is a flowchart illustrating an operation of the SSD of the first embodiment.

FIG. 2 is a flowchart illustrating an operation of the SSD 100 of the first embodiment. Referring to FIG. 2, as an example, description will be made on the assumption that a transition between the power saving mode and the normal mode is executed at a request from the host 200.

When the SSD 100 is turned ON, the control unit 31 first starts up the memory chip 2 (step S1). While the SSD 100 is turned OFF, the operation parameter 26 is not stored in the parameter register 23. In addition, the operation parameter 26 is not stored in the SRAM 32. For this reason, in step S1, the control unit 31 starts up the memory chip 2 in a mode in which the parameter 26 is read from the memory cell array 22.

In the memory chip 2, the peripheral circuit 21 reads the parameter 26 from the parameter area 25, and stores the read parameter 26 in the parameter register 23 (step S2). In this way, until transitioning to the power saving mode, the peripheral circuit 21 of the memory chip 2 may access the normal area 24 by using the parameter 26 stored in the parameter register 23.

In response to receiving a request for a transition from the normal mode to the power saving mode from the host 200 (step S3), the control unit 31 reads the parameter 26 from the parameter register 23 through the peripheral circuit 21, and stores the read parameter 26 in the SRAM 32 (step S4). Then, the control unit 31 turns OFF the memory chip 2 (step S5).

Then, in response to receiving a request for a transition from the power saving mode to the normal mode from the host 200 (step S6), the control unit 31 starts up the memory chip 2 (step S7). In step S7, the control unit 31 starts up the memory chip 2 in a mode in which the parameter 26 is not read from the memory cell array 22. Then, the control unit 31 reads the parameter 26 from the SRAM 32, and stores the read parameter 26 in the parameter register 23 through the peripheral circuit 21 (step S8). In this way, until transitioning to the power saving mode again, the peripheral circuit 21 of the memory chip 2 may access the normal area 24 by using the parameter 26 stored in the parameter register 23.

After performing the operation of step S8, the control unit 31 deletes the parameter 26 stored in the SRAM 32 (step S9). The control unit 31 may use the storage area of the SRAM 32 after the parameter 26 is deleted as a use other than a use of storing the parameter 26. For example, the control unit 31 may use the storage area of the SRAM 32 after the parameter 26 is deleted as a cache area of transfer data between the host 200 and the NAND memory 1.

After the operation of step S9, the operation of step S3 is performed.

In this way, according to the first embodiment of the invention, the control unit 31 retains the parameter 26 in the SRAM 32 when the operation mode is the power saving mode, and transfers the parameter 26 retained in the SRAM 32 to the parameter register 23 when the operation mode is returned from the power saving mode to the normal mode. Since it takes less time to access the SRAM 32 for reading than to access the memory cell array 22 for reading, it is possible to reduce a period of time for transitioning from the power saving mode to the normal mode. In addition, since it may be unnecessary to access the memory cell array 22 for reading each time the operation mode is returned from the power saving mode to the normal mode, it is possible to reduce an exhaustion of the memory cell array 22.

In the above description, description has been made on the assumption that the parameter 26 is stored in the SRAM 32 each time the operation mode is transitioned from the normal mode to the power saving mode. However, a timing of storing the parameter 26 in the SRAM 32 is not limited as long as the timing is earlier than a timing at which the operation mode is transitioned from the normal mode to the power saving mode.

Description has been made on the assumption that the parameter 26 stored in the SRAM 32 is deleted each time the operation mode is returned from the power saving mode to the normal mode. However, the parameter 26 may not be deleted from the SRAM 32. When the parameter 26 may not be deleted from the SRAM 32, a period of time at which the operation mode is returned from the power saving mode to the normal mode may be reduced.

Figure 3:
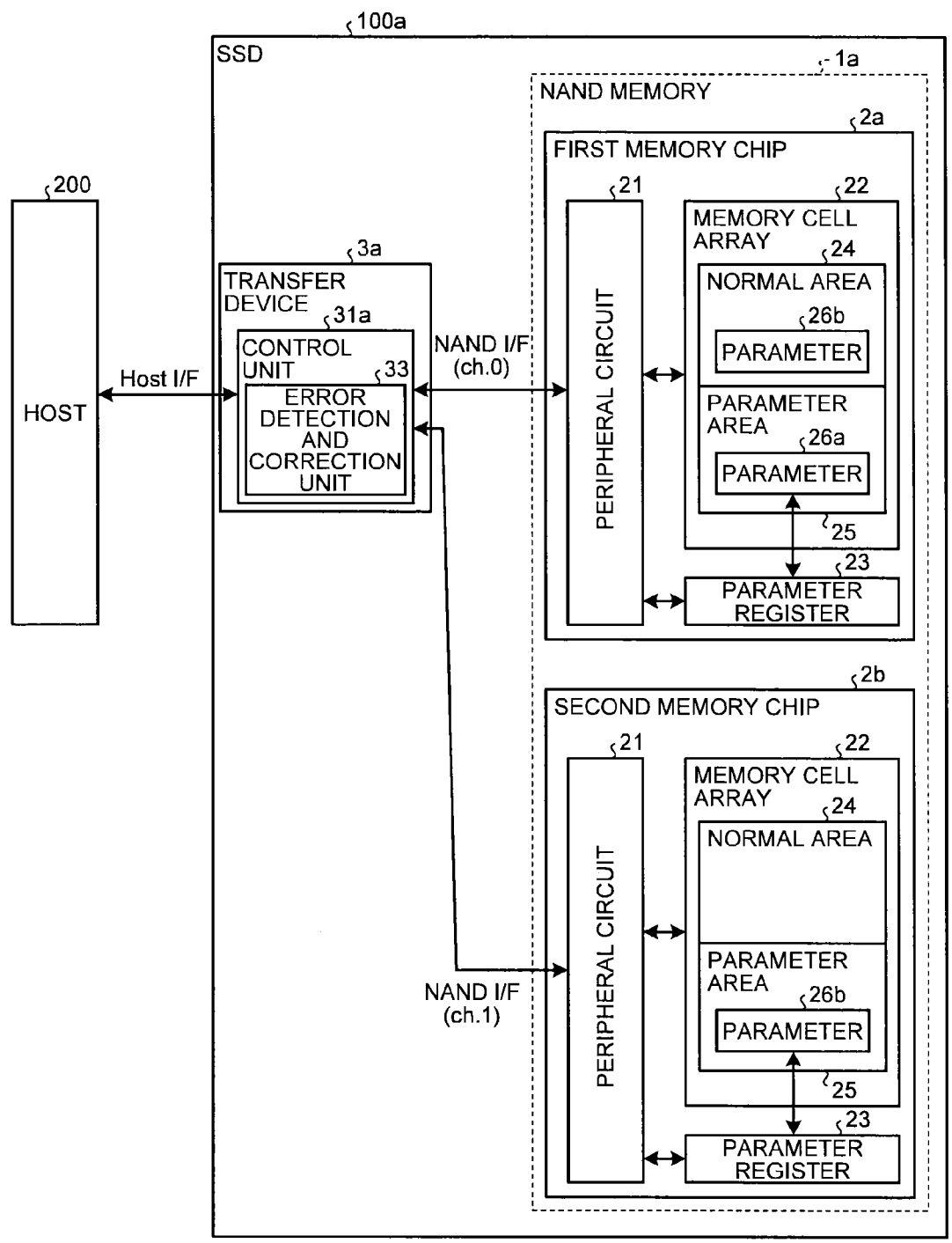
FIG. 3 is a diagram illustrating a configuration of an SSD of a second embodiment.

FIG. 3 is a diagram illustrating a configuration of an SSD of a second embodiment. An element of an SSD 100a of the second embodiment similar to that of the first embodiment is denoted by the same reference numeral, and repeated description is not provided.

As illustrated in FIG. 3, the SSD 100a of the second embodiment includes a NAND memory 1a and a transfer device 3a. The NAND memory 1a includes two memory chips 2a and 2b.

The memory chips 2a and 2b include a peripheral circuit 21, a memory cell array 22, and a parameter register 23, respectively. In the memory cell array 22 of each of the memory chips 2a and 2b, a normal area 24 and a parameter area 25 are secured. The parameter area 25 of the first memory chip 2a stores a parameter 26a associated with the first memory chip 2a. The parameter area 25 of the second memory chip 2b stores a parameter 26b associated with the second memory chip 2b. Herein, the normal area 24 of the first memory chip 2a stores the parameter 26b associated with the second memory chip 2b. The parameter 26b is encoded by an error detection and correction unit 33 to be described below, and stored in the normal area 24 of the first memory chip 2a.

The transfer device 3a includes a control unit 31a. The control unit 31a is connected to a Host I/F and NAND I/Fs of two channels (ch.0 and ch.1). The control unit 31a may control the NAND I/Fs of two channels independently of each other. Herein, the first memory chip 2a is connected to the NAND I/F of ch.0, and the second memory chip 2b is connected to the NAND I/F of ch.1. By performing simultaneous and parallel control on the NAND I/Fs of two channels, the control unit 31a may perform parallel access with respect to the first memory chip 2a and the second memory chip 2b.

In addition, the control unit 31a includes the error detection and correction unit 33. When writing normal data in the normal area 24, the control unit 31a encodes the normal data to be written by using the error detection and correction unit 33 to perform error detection and error correction. Then, when reading the normal data from the normal area 24, error detection and error correction of the read normal data may be performed using the error detection and correction unit 33.

In addition, in a power saving mode, the control unit 31a turns OFF the second memory chip 2b, and does not turn OFF the first memory chip 2a. Then, when returning the operation mode of the SSD 100a from the power saving mode to the normal mode, the control unit 31a reads the parameter 26b of the second memory chip 2b from the normal area 24 of the first memory chip 2a, and stores the read parameter 26b in the parameter register 23 of the second memory chip 2b.

Figure 4:
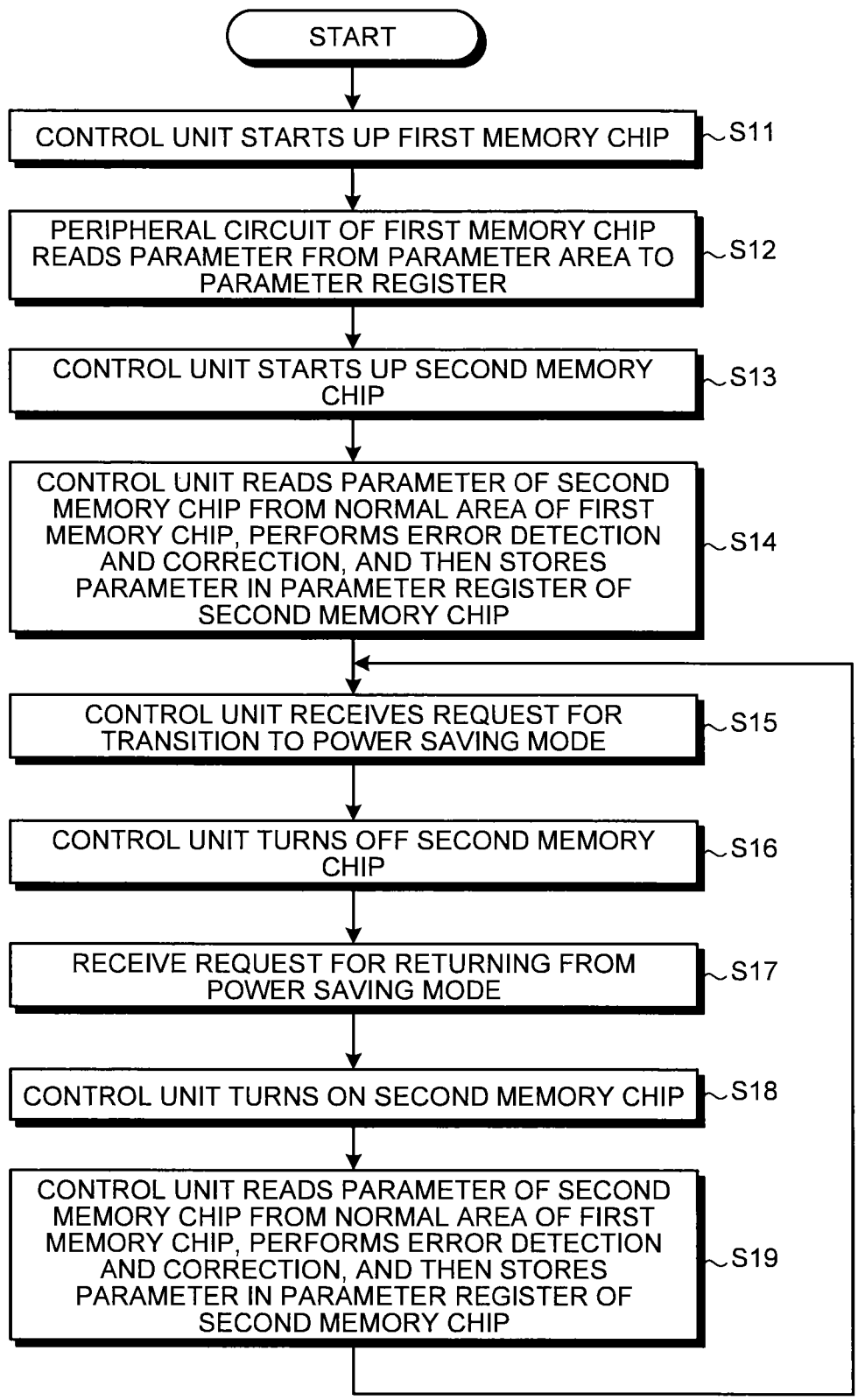
FIG. 4 is a flowchart illustrating an operation of the SSD of the second embodiment.

FIG. 4 is a flowchart illustrating an operation of the SSD 100a of the second embodiment. Herein, description will be made on the assumption that the operation parameter 26b of the second memory chip 2b is copied and retained in the normal area 24 of the first memory chip 2a in advance.

When the SSD 100a is turned ON, the control unit 31a first starts up the first memory chip 2a (step S11). In step S11, the first memory chip 2a is started up in a mode in which the parameter 26a is read from the memory cell array 22.

In memory chip 2a, the peripheral circuit 21 reads the parameter 26a from the parameter area 25, and stores the read parameter 26a in the parameter register 23 (step S12). In this way, the peripheral circuit 21 of the memory chip 2a may access the normal area 24 using the parameter 26a stored in the parameter register 23.

Subsequently, the control unit 31a starts up the second memory chip 2b (step S13). In step S13, the control unit 31a starts up the second memory chip 2b in a mode in which the parameter 26b is not read from the memory cell array 22.

Then, the control unit 31a reads the parameter 26b from the normal area 24 of the first memory chip 2a, and stores the read parameter 26b in the parameter register 23 of the second memory chip 2b through the peripheral circuit 21 of the second memory chip 2b (step S14). When reading the parameter 26b from the normal area 24 of the first memory chip 2a, the control unit 31a starts up the error detection and correction unit 33, and detects an error and corrects the detected error with respect to the read parameter 26b. After the operation of step S14, the peripheral circuit 21 of the second memory chip 2b may access the normal area 24 using the parameter 26b stored in the parameter register 23.

When a request for a transition from the normal mode to the power saving mode is received from a host 200 (step S15), the control unit 31a turns OFF the second memory chip 2b (step S16). Then, a request for a transition from the power saving mode to the normal mode is received from the host 200 (step S17), the control unit 31a performs a similar operation to the operation of step S13 and S14 in step S18 and step S19. After the operation of step S19, the operation of step S15 is performed.

In this way, according to the second embodiment, the control unit 31a retains the parameter 26b of the second memory chip 2b in the normal area 24 of the first memory chip 2a. When returning the operation mode from the power saving mode to the normal mode, the control unit 31a reads the parameter 26b from the normal area 24 of the first memory chip 2a, and stores the read parameter 26b in the parameter register 23 of the second memory chip 2b. Since access to the normal area 24 for reading is performed using the parameter 26a, it takes less time to perform the access for reading than to access the parameter area 25 for reading. Accordingly, a period of time for returning from the power saving mode to the normal mode may be reduced. In addition, since it may be unnecessary to access the parameter area 25 for reading each time the operation mode is returned from the power saving mode to the normal mode, it is possible to reduce an exhaustion of the parameter area 25.

In addition, since the control unit 31a may perform error detection or error correction when accessing the normal area 24, it is possible to prevent a malfunction of the second memory chip 2b. The error detection and correction unit 33 may be incorporated in the transfer device 3a, and may be incorporated in the NAND memory 1a. In addition, the control unit 31a may multiplex and retain the parameter 26b in the normal area 24 of the first memory chip 2a.

At the time of startup of the SSD 100a, a peak current at the time of startup is suppressed, and thus the memory chips 2a and 2b may be successively turned ON. In this case, according to the second embodiment, a startup time of the memory chip 2b is reduced, and thus a startup time of the SSD 100a is reduced.

In addition, in the above description, description has been made on the assumption that the operation parameter 26b of the second memory chip 2b is copied and retained in the normal area 24 of the first memory chip 2a in advance. A timing at which the operation parameter 26b of the second memory chip 2b is stored in the normal area 24 of the first memory chip 2a is not particularly limited. For example, at an initial startup time of the SSD 100a, the control unit 31a may read the parameter 26b from the parameter area 25 of the second memory chip 2b, and store the parameter 26b in the normal area 24 of the first memory chip 2a. In addition, at an initial startup time of the SSD 100a, the control unit 31a may start up the second memory chip 2b in a mode in which the parameter 26b is read from the memory cell array 22, read the parameter 26b stored in the parameter register 23, and store the parameter 26b in the normal area 24 of the first memory chip 2a. Determination on whether it is an initial startup time of the SSD 100a may be assigned from the host 200 to the control unit 31a. In addition, the control unit 31a may keep a log in the normal area 24, and perform the determination based on the presence of the log.

In addition, in the above description, an example in which the NAND memory 1a is configured by connecting the respective two memory chips 2a and 2b to NAND I/Fs of different channels has been described. Three or more memory chips may be included in the NAND memory 1a.

Figure 5:
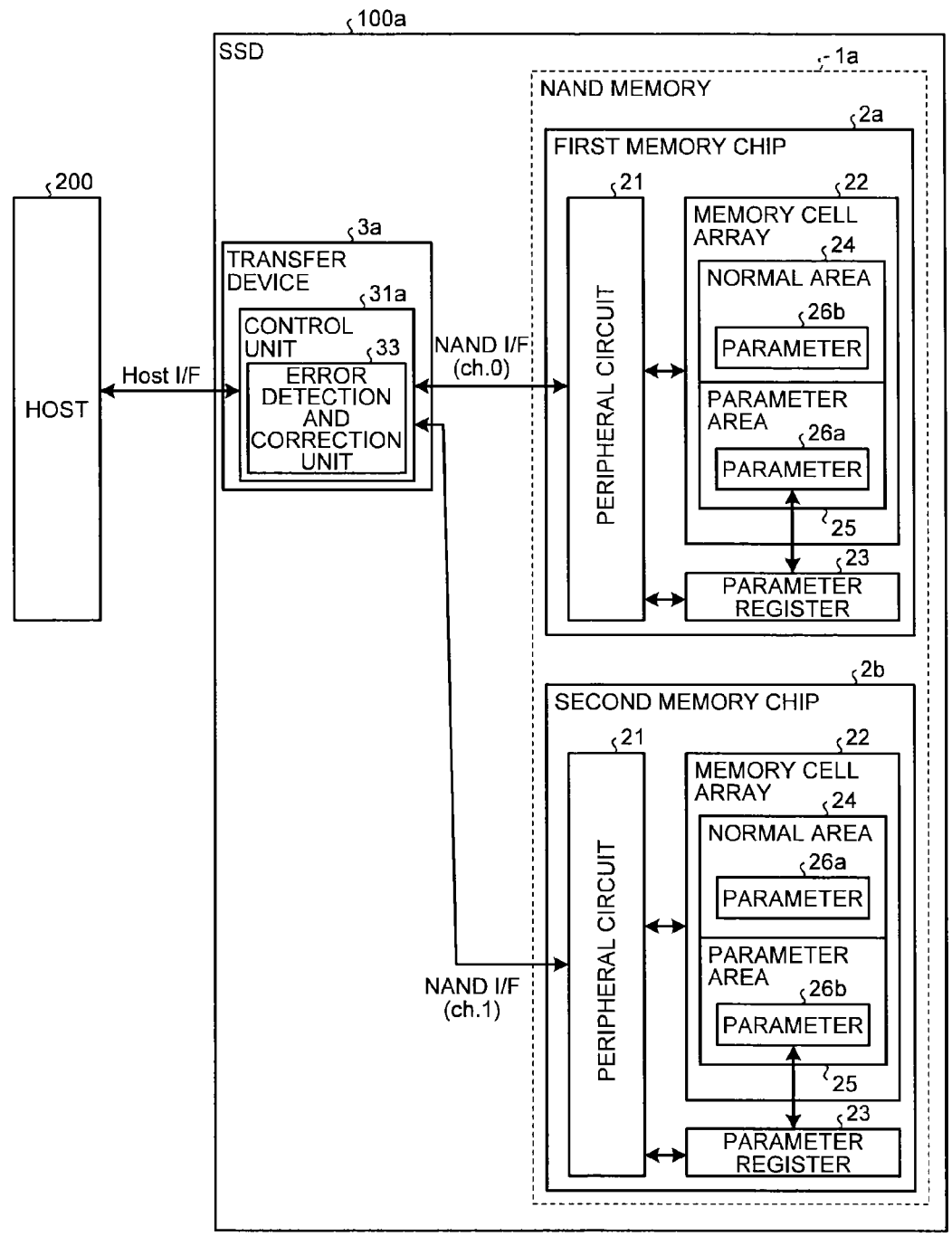
FIG. 5 is a diagram illustrating another configuration of the SSD of the second embodiment.
Figure 6:
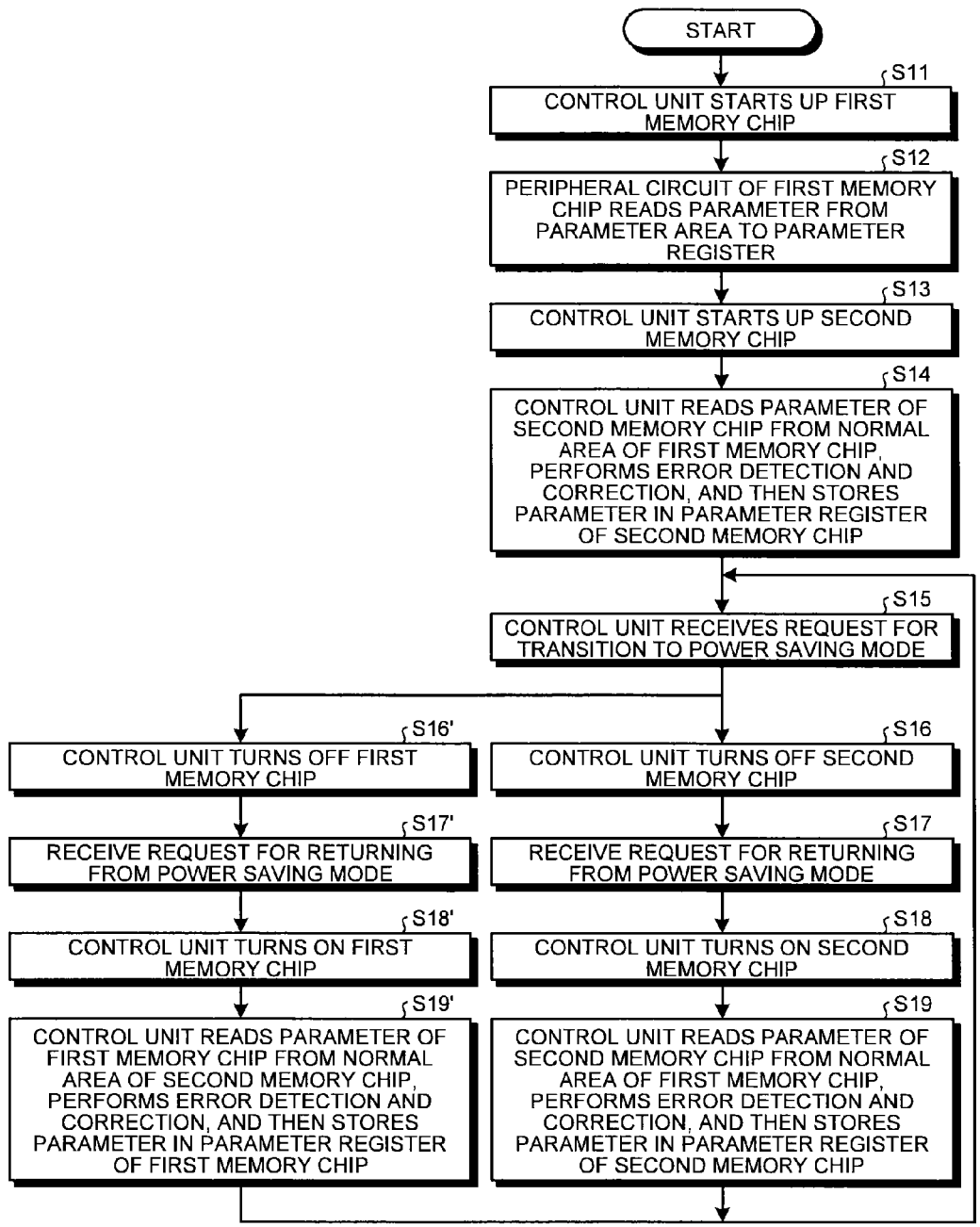
FIG. 6 is a flowchart illustrating another operation of the SSD of the second embodiment.

In addition, as illustrated in FIG. 5, the first memory chip 2a and the second memory chip 2b may share parameters (parameters 26a and 26b) of each other in the normal area 24. In this case, as illustrated in FIG. 6, after performing the operation of step S15, the control unit 31a may select a memory chip to be turned OFF and a memory chip not to be turned OFF from the first memory chip 2a and the second memory chip 2b. When the first memory chip 2a is not turned OFF in the power saving mode, the operation of step S16 through step S19 is performed. When the second memory chip 2b is not turned OFF in the power saving mode, the operations of step S16' through step S19' are performed instead of the operations of step S16 through step S19. A scheme of selecting a memory chip not to be turned OFF in the power saving mode is not particularly limited. For example, when a memory chip in which write data is to be written is subsequently specified, the control unit 31a may select the memory chip as a memory chip not to be turned OFF. Subsequently, by not turning OFF the memory chip in which write data is to be written in the power saving mode, the control unit 31a may initiate writing at the time of returning to the normal mode early.

Figure 7:
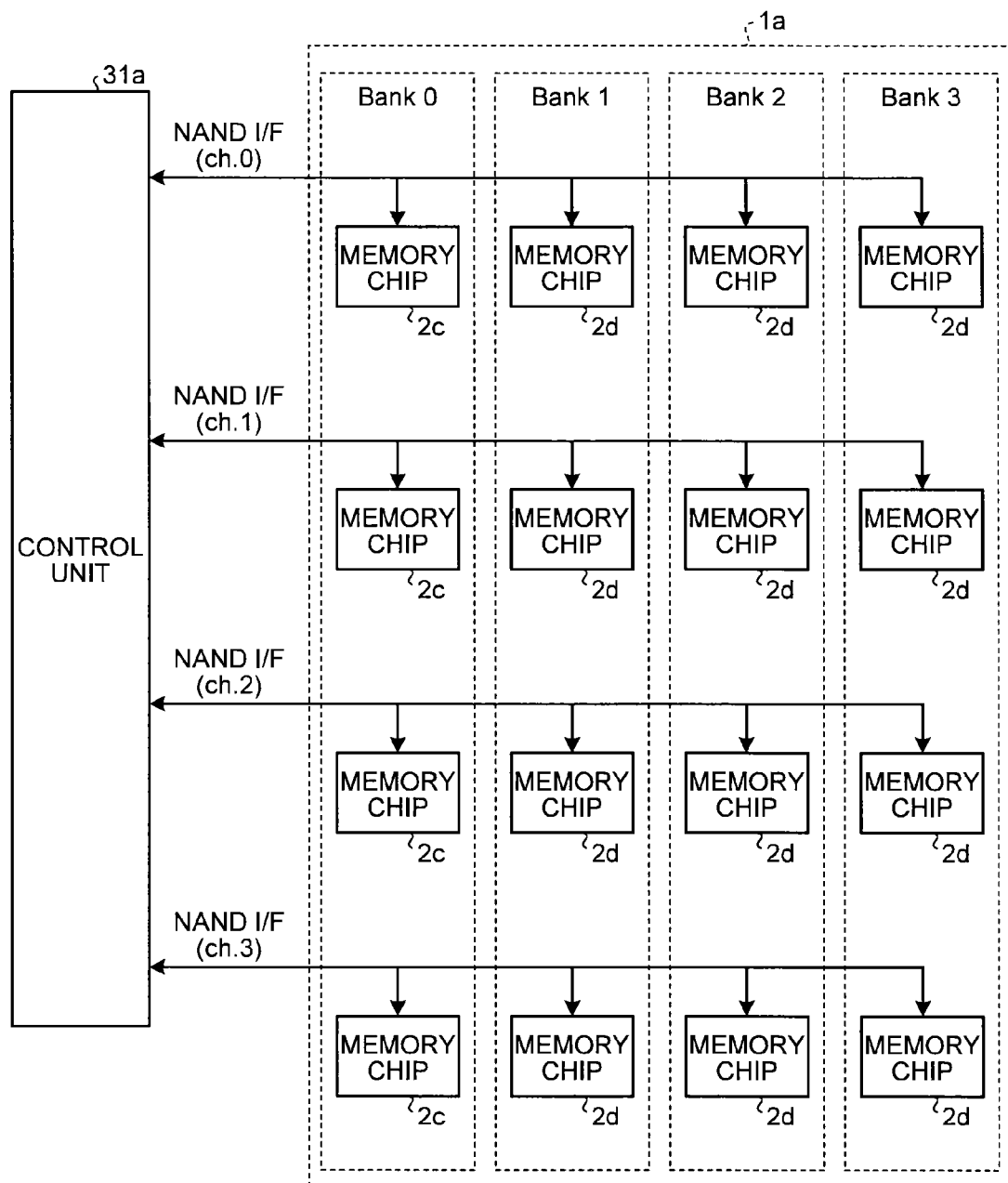
FIG. 7 is a diagram illustrating another configuration example of NAND memory.

FIG. 7 is a diagram illustrating another configuration example of the NAND memory 1a. As illustrated, the control unit 31a includes NAND I/Fs of four channels (ch.0 through ch.3). The respective NAND I/Fs of ch.0 through ch.3 are connected with a memory chip 2c having the same configuration as that of the memory chip 2a, and three memory chips 2d having the same configuration as that of the memory chip 2b. Four memory chips 2c and twelve memory chips 2d illustrated in FIG. 7 are included in the NAND memory 1a.

A total of four memory chips (a memory chip 2c and three memory chips 2d) belonging to ch.0 are included in banks different from one another among four banks (bank 0 through bank 3), and are configured to be able to perform a bank interleave. Herein, the memory chip 2c is included in the bank 0. Similarly, four memory chips belonging to each of ch.1 through ch.3 are included in banks different from one another among the bank 0 through the bank 3, and are configured to be able to perform a bank interleave. The bank interleave is a technology that conceals a transfer time between the transfer device 3a and the peripheral circuit 21 using a period of time for an operation in a memory chip (an operation in which the peripheral circuit 21 accesses the memory cell array 22) by controlling each of a plurality of banks while successfully delaying a timing. The control unit 31a functions as a parallel driving unit that causes four memory chips belonging to respective channels to perform a bank interleave operation while causing four memory chips, to which the same bank number is assigned, belonging to four channels to operate in parallel. The control unit 31a may cause banks of bank numbers that are different for each channel to operate in parallel.

Herein, each memory chip 2c stores parameters of three memory chips 2d belonging to the same channel as that of the memory chip 2c in the normal area 24. In the power saving mode, the control unit 31a does not turn OFF the four memory chips 2c belonging to the bank 0, and turns OFF the twelve memory chips 2d belonging to the bank 1 through the bank 3. At the time of returning from the power saving mode to the normal mode, the control unit 31a reads parameters of the twelve memory chips 2d belonging to the bank 1 through the bank 3 from the normal area 24 of the memory chips 2c belonging to the bank 0, and stores the parameters in the parameter register 23 of the memory chips 2d belonging to a channel of the same bank.

In this way, in the normal area 24 of a memory chip 2c among a plurality of memory chips 2c and 2d, a parameter of another memory chip 2d is stored, thereby reducing a period of time for returning of the memory chip 2d of each channel. Description has been made on the assumption that the NAND memory 1a includes one memory chip 2c for each channel. However, one memory chip 2c may be included in the NAND memory 1a for each bank. In addition, one memory chip 2c may be included in the NAND memory 1a. In addition, individual memory chips included in the NAND memory 1a may retain parameters of all of the other memory chips in the normal area 24, and the control unit 31a may not turn OFF an arbitrary memory chip among sixteen memory chips during the power saving mode. When memory chips that are not turned OFF during the power saving mode are decreased, a period of time for returning from the power saving mode to the normal mode increases. However, power consumption during the power saving mode may be further reduced.

Figure 8:
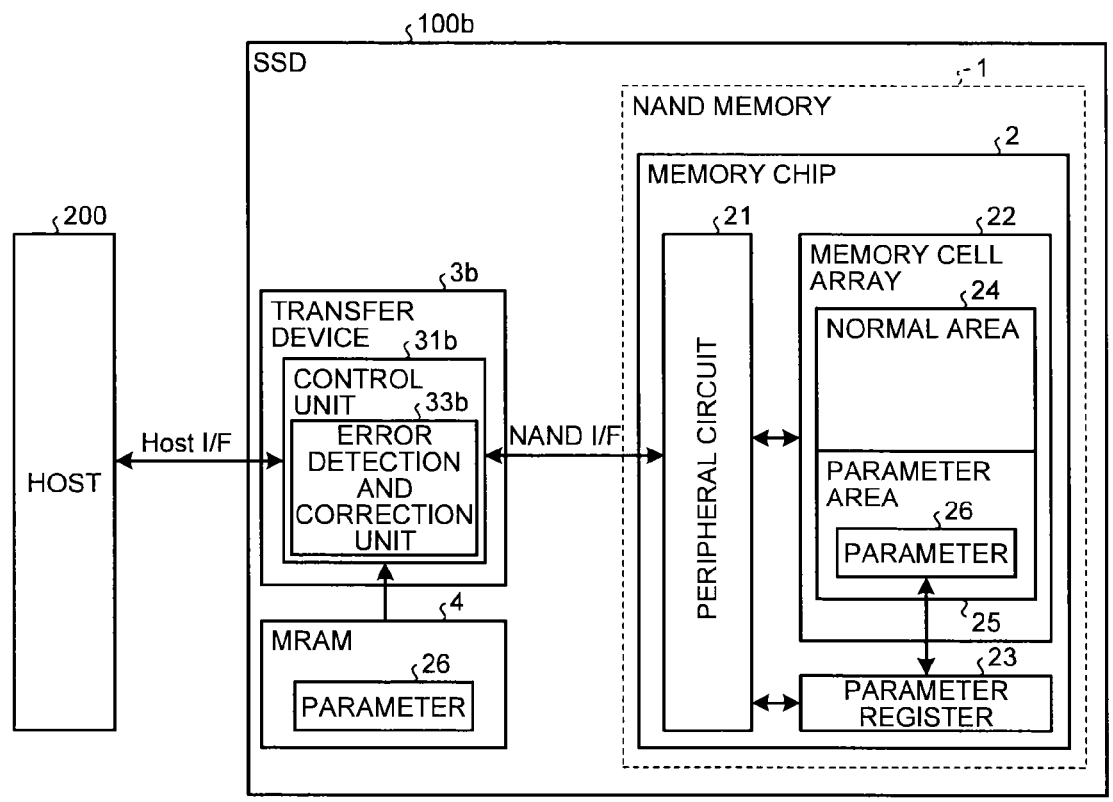
FIG. 8 is a diagram illustrating a configuration of an SSD of a third embodiment.

FIG. 8 is a diagram illustrating a configuration of an SSD of a third embodiment. An element of an SSD 100b of the third embodiment similar to an element described in the first and second embodiments is denoted by the same reference numeral as that of the first and second embodiments, and repeated description is not provided.

As illustrated in FIG. 8, the SSD 100b of the third embodiment includes a NAND memory 1, a transfer device 3b, and a magnetoresistive random access memory (MRAM) 4.

The NAND memory 1 includes a memory chip 2. A plurality of memory chips 2 may be included in the NAND memory 1. The NAND memory 1 and the transfer device 3b are connected to each other through a NAND interface. The memory chip 2 includes a peripheral circuit 21, a memory cell array 22, and a parameter register 23. In the memory cell array 22, a normal area 24 in which normal data is stored and a parameter area 25 in which a parameter 26 of the memory chip 2 is stored are secured. The normal data is encoded by an error detection and correction unit 33b to be described below, and stored in the normal area 24.

The transfer device 3b includes a control unit 31b. The control unit 31b is connected to a Host I/F and the NAND I/F. In addition, the control unit 31b is connected to the MRAM 4.

The MRAM 4 is a memory device that may be accessed at a higher speed when compared to the NAND memory 1. In addition, the MRAM 4 may retain stored content even when power is turned OFF in response to the SSD 100b being transitioned to a power saving mode. In the third embodiment, the control unit 31b stores the parameter 26 in the MRAM 4. When the SSD 100b is returned from the power saving mode to a normal mode, the control unit 31b reads the parameter 26 from the MRAM 4, and stores the read parameter 26 in the parameter register 23.

The control unit 31b includes the error detection and correction unit 33b. When normal data is written in the normal area 24, the normal data is encoded using the error detection and correction unit 33b. When the normal data is read, the normal data is decoded using the error detection and correction unit 33b, and error detection and correction associated with the normal data is performed. In addition, when storing the parameter 26 in the MRAM 4, the control unit 31b encodes the parameter 26 using the error detection and correction unit 33b. When the parameter 26 is read from the MRAM 4, the parameter 26 is decoded using the error detection and correction unit 33b, and error detection and correction associated with the parameter 26 is performed.

FIG. 9 is a flowchart illustrating an operation of the SSD 100b of the third embodiment. Herein, description will be made on the assumption that the parameter 26 is stored in the MRAM 4 in advance.

When the SSD 100b is turned ON, the control unit 31b starts up the MRAM 4 and the memory chip 2 (step S21). In step S21, the memory chip 2 is started up in a mode in which the parameter 26 is not read from the memory cell array 22.

Subsequently, the control unit 31b reads the parameter 26 from the MRAM 4, and stores the read parameter 26 in the parameter register 23 of the memory chip 2 through the peripheral circuit 21 of the memory chip 2 (step S22). When reading the parameter 26 from the MRAM 4, the control unit 31b starts up the error detection and correction unit 33b, and detects an error and corrects the detected error with respect to the read parameter 26. After the operation of step S22, the peripheral circuit 21 of the memory chip 2 may access the normal area 24 using the parameter 26 stored in the parameter register 23.

In response to receiving a request for a transition from the normal mode to the power saving mode from the host 200 (step S23), the control unit 31b turns OFF the memory chip 2 and the MRAM 4 (step S24). In response to receiving a request for a transition from the power saving mode to the normal mode from the host 200 (step S25), the control unit 31b performs a similar operation to the operation of step S21 and S22 in step S26 and step S27. After the operation of step S27, the operation of step S23 is performed.

In the above description, an example in which the MRAM 4 is applied as a memory that is non-volatile and is faster than the NAND memory 1 has been described. However, for example, another memory such as NOR flash memory or Ferroelectric Random Access Memory (FeRAM) may be applied to non-volatile memory.

In this way, a memory device, which is non-volatile and is faster than the NAND memory 1, such as the MRAM 4 may be applied to a retaining destination of the operation parameter 26 during the power saving mode. Non-volatile memory such as the MRAM 4 has a faster startup time than that of the NAND memory 1, and thus a startup time of the SSD 100b may be reduced.

In addition, since error detection or error correction is performed when the parameter 26 is written in and read from the MRAM 4, a malfunction of the memory chip 2 may be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile first memory that includes a volatile first register retaining a first operation parameter, and is capable of operating using the first operation parameter retained in the first register;
a second memory; and
a control unit that switches an operation mode between a first mode and a second mode in which power consumption is low when compared to the first mode,
wherein the control unit
performs a first operation of retaining the first operation parameter in the second memory,
turns OFF the first memory while retaining the first operation parameter in the second memory when the operation mode is switched from the first mode to the second mode, and
performs a second operation of turning on the first memory, and transferring the first operation parameter retained in the second memory to the first register when the operation mode is switched from the second mode to the first mode.

2. The memory system according to claim 1,
wherein the first memory includes:
a non-volatile first memory cell array including a first storage area; and
a first peripheral circuit that accesses the first storage area using the first operation parameter retained in the first register.

3. The memory system according to claim 2,
wherein the first memory cell array includes a second storage area that retains a master of the first operation parameter in advance,
the first peripheral circuit is capable of performing a third operation of copying the master of the first operation parameter retained in the second storage area in the first register, and
the control unit causes the first peripheral circuit to perform the third operation at a timing at which the first operation parameter is retained in neither the first register nor the second memory.

4. The memory system according to claim 3,
wherein the second memory is a non-volatile memory which is faster to access than the first memory.

5. The memory system according to claim 3, further comprising a processing unit that detects and corrects an error of data to be accessed when the first storage area is accessed.

6. The memory system according to claim 2,
wherein the second memory includes:
a non-volatile second memory cell array including a third storage area and a fourth storage area that retains a master of the second operation parameter in advance;
a volatile second register that retains the second operation parameter; and
a second peripheral circuit that accesses the third storage area using the second operation parameter retained in the second register,
wherein the control unit performs the first operation using the third storage area as a retaining destination of the first operation parameter.

7. The memory system according to claim 6,
wherein the control unit performs the first operation using the first storage area as a retaining destination of the second operation parameter.

8. The memory system according to claim 7, further comprising
a processing unit that detects and corrects an error of data to be accessed when the first storage area and the third storage area are accessed.

9. The memory system according to claim 6,
wherein the second peripheral circuit is capable of performing a fourth operation of copying the master of the second operation parameter retained in the fourth storage area in the second register, and
the control unit turns on the second memory and causes the second peripheral circuit to perform the fourth operation at the time of startup of the memory system, and turns on the first memory, and performs the second operation using the third storage area as a retaining source of the first operation parameter after the fourth operation is completed.

10. The memory system according to claim 9, further comprising
a processing unit that detects and corrects an error of data to be accessed when the first storage area and the third storage area are accessed.

11. The memory system according to claim 6, comprising
a plurality of channels to which the first memory and the second memory are connected through the same data line,
wherein the control unit performs the first operation using the second memory as a retaining destination of the first operation parameter with respect to each of the channels.

12. The memory system according to claim 11, further comprising
a processing unit that detects and corrects an error of data to be accessed when the first storage area and the third storage area are accessed.

13. The memory system according to claim 6, further comprising
a processing unit that detects and corrects an error of data to be accessed when the first storage area and the third storage area are accessed.

14. The memory system according to claim 1,
wherein the second memory is a non-volatile memory which is faster to access than the first memory.

15. The memory system according to claim 2,
wherein the second memory is a non-volatile memory which is faster to access than the first memory.

16. The memory system according to claim 2, further comprising
a processing unit that detects and corrects an error of data to be accessed when the first storage area is accessed.

17. The memory system according to claim 14, further comprising
a processing unit that detects and corrects an error of data to be accessed when the first storage area and the second memory are accessed.

18. A control method of a memory system including a non-volatile first memory that includes a volatile first register retaining a first operation parameter, and a second memory, the method comprising:
performing a first operation of retaining a first operation parameter in the second memory;
turning OFF the first memory while retaining the first operation parameter in the second memory when an operation mode is switched from a first mode to a second mode in which power consumption is low when compared to the first mode; and
performing a second operation of turning on the first memory, and transferring the first operation parameter retained in the second memory to the first register when the operation mode is switched from the second mode to the first mode.

19. The control method according to claim 18,
wherein the memory system includes a plurality of channels to which the first memory and the second memory are connected through the same data line, and
the first operation is performed using the second memory as a retaining destination of the first operation parameter with respect to each of the channels.

20. The control method according to claim 18, further comprising:
assigning an error detecting code or an error correcting code to the first operation parameter, and causing the first operation parameter to be retained in the second memory when the first operation is performed; and
performing error detection or error correction of the first operation parameter retained in the second memory based on the error detecting code or the error correcting code when the second operation is performed.

* * * * *